US011828663B2

(12) United States Patent
Wenzel et al.

(10) Patent No.: US 11,828,663 B2
(45) Date of Patent: Nov. 28, 2023

(54) STRAIN BEAM STRAP TENSION DETECTOR

(71) Applicant: Intelligent Secure Strap Inc., Edmonton (CA)

(72) Inventors: Blair Wenzel, Edmonton (CA); Tanner DeLorey, Edmonton (CA); Dwayne Parenteau, Edmonton (CA)

(73) Assignee: Intelligent Secure Strap Inc., Edmonton (CA)

( * ) Notice: Subject to any disclaimer, the term of this patent is extended or adjusted under 35 U.S.C. 154(b) by 248 days.

(21) Appl. No.: 17/107,464

(22) Filed: Nov. 30, 2020

(65) Prior Publication Data

US 2022/0146341 A1    May 12, 2022

(30) Foreign Application Priority Data

Nov. 10, 2020  (CA) .................................. CA 3098709

(51) Int. Cl.
*G01L 1/22* (2006.01)
*G01L 25/00* (2006.01)
*B60P 7/08* (2006.01)

(52) U.S. Cl.
CPC .............. *G01L 1/22* (2013.01); *B60P 7/0861* (2013.01); *G01L 25/00* (2013.01)

(58) Field of Classification Search
CPC . B60R 2022/4841; G01L 5/047; G01L 5/102; G01L 5/04; G01L 5/108; G01L 5/106; G01L 5/045; B60P 7/0861
See application file for complete search history.

(56) References Cited

U.S. PATENT DOCUMENTS

| | | | | | |
|---|---|---|---|---|---|
| 3,618,378 A | * | 11/1971 | Shull et al. | ............... | G01L 5/10 73/862.633 |
| 3,817,093 A | * | 6/1974 | Williams | ............... | G01L 5/107 73/862.474 |
| 3,832,899 A | * | 9/1974 | Nicolau | .................... | G01L 5/08 73/862.194 |
| 4,027,130 A | * | 5/1977 | Filip | ...................... | H01H 35/00 200/518 |
| 4,241,616 A | * | 12/1980 | Mastrigt | .................. | G01L 5/04 73/862.472 |
| 4,846,000 A | * | 7/1989 | Steinseifer | ............... | G01L 5/04 73/862.471 |

(Continued)

FOREIGN PATENT DOCUMENTS

| | | |
|---|---|---|
| DE | 202012012665 | 10/2013 |
| GB | 2506581 | 4/2014 |
| WO | 2020001704 | 1/2020 |

*Primary Examiner* — Tran M. Tran
(74) *Attorney, Agent, or Firm* — Lowe Graham Jones PLLC (57) ABSTRACT

There is a strap tension detector for detecting tension in a strap. A housing has an upper portion and a lower portion. The upper portion and lower portion are adapted to receive the strap. A strain beam is mounted to one of the upper portion and the lower portion. The strain beam is arranged at an angle to the strap to extend across the width of the strap when the strap is placed between the upper portion and the lower portion and extending through the first and second strap-receiving openings so that the strap bears on the strain beam when taut. A strain gauge is operatively connected to detect strain across the strain beam.

16 Claims, 9 Drawing Sheets

(56) References Cited

U.S. PATENT DOCUMENTS

| | | | | |
|---|---|---|---|---|
| 4,924,043 A * | 5/1990 | Aubry | .................. | G01D 5/04 200/52 R |
| 4,992,778 A * | 2/1991 | McKeen | .................. | G01L 5/047 340/685 |
| 5,026,230 A * | 6/1991 | Dolezych | .................. | G01L 5/06 267/71 |
| 5,109,707 A * | 5/1992 | VanGerpen | .................. | G01L 1/044 73/862.57 |
| 5,656,994 A * | 8/1997 | Heninger | .................. | B60R 22/48 446/28 |
| 5,666,998 A * | 9/1997 | De Jager | .................. | G01L 5/107 139/194 |
| 6,205,868 B1 * | 3/2001 | Miller | .................. | G01D 5/147 324/207.2 |
| 6,450,534 B1 * | 9/2002 | Blakesley | .................. | B60R 21/0155 280/801.1 |
| 6,508,114 B2 * | 1/2003 | Lawson | .................. | G01L 5/101 73/159 |
| 6,520,032 B2 * | 2/2003 | Resh | .................. | B60R 21/013 73/831 |
| 6,623,032 B2 * | 9/2003 | Curtis | .................. | B60R 21/01556 280/801.1 |
| 6,796,192 B2 * | 9/2004 | Sullivan | .................. | B60R 22/48 73/862.391 |
| 6,854,415 B2 * | 2/2005 | Barnes | .................. | B60R 22/48 340/457.1 |
| 6,959,779 B2 * | 11/2005 | Curtis | .................. | B60R 21/01556 180/268 |
| 6,993,436 B2 * | 1/2006 | Specht | .................. | G01D 5/145 702/41 |
| 7,112,023 B1 | 9/2006 | Tardif | | |
| 7,231,693 B2 | 6/2007 | Wilcox et al. | | |
| 7,242,286 B2 * | 7/2007 | Knox | .................. | B60R 22/48 73/862.391 |
| 7,493,834 B2 * | 2/2009 | Gonzalez Gallegos | .................. | G01L 5/107 73/862.471 |
| 8,506,220 B2 | 8/2013 | Morland | | |
| 8,635,918 B2 * | 1/2014 | Lanter | .................. | B60R 22/105 73/862.391 |
| 9,784,629 B2 * | 10/2017 | Miyata | .................. | G01L 5/10 |
| 10,288,505 B2 | 5/2019 | Miyata | | |
| 10,328,841 B2 * | 6/2019 | Bika | .................. | H04W 4/70 |
| 10,625,658 B2 * | 4/2020 | Taylor | .................. | G08B 13/06 |
| 10,724,911 B1 * | 7/2020 | Lawson | .................. | B65G 43/02 |
| 10,857,916 B2 * | 12/2020 | Glerum | .................. | B60N 2/2806 |
| 11,370,348 B2 * | 6/2022 | Ehnimb | .................. | G08B 21/182 |
| 2001/0035122 A1 * | 11/2001 | Margetts | .................. | G01L 5/047 116/281 |
| 2003/0070846 A1 * | 4/2003 | Wolfe | .................. | G01G 23/005 177/144 |
| 2003/0197094 A1 * | 10/2003 | Preston | .................. | B64D 21/00 244/142 |
| 2013/0160254 A1 * | 6/2013 | Stoddard | .................. | B60P 7/0861 24/68 CD |
| 2019/0001863 A1 * | 1/2019 | Taylor | .................. | H04W 4/70 |
| 2021/0025770 A1 * | 1/2021 | Sanders | .................. | G01L 5/045 |
| 2021/0229626 A1 * | 7/2021 | Demirovic | .................. | B60R 22/48 |
| 2022/0111784 A1 * | 4/2022 | Myers | .................. | G07C 3/02 |
| 2022/0242302 A1 * | 8/2022 | Goetz | .................. | B60P 7/0869 |
| 2022/0371506 A1 * | 11/2022 | Schultz | .................. | H04M 1/72415 |

* cited by examiner

STRAIN BEAM STRAP TENSION DETECTOR

PRIORITY CLAIM

This application claims the benefit of priority from Canada Patent Application No. 3098709 filed on Nov. 10, 2020, the contents of which is incorporated herein by reference in its entirety.

FIELD OF THE INVENTION

Strap tension detector.

BACKGROUND OF THE INVENTION

Straps and other securing devices are commonly used for securing loads during transportation of cargo. These straps can fail for a variety of reasons, including normal wear and tear, exposure to the elements, road conditions, damaged tightening mechanisms such as rachets, and vandalism. Damaged straps can cause significant safety concerns if the cargo becomes unsecure, particularly during transport. Visual inspection of straps may not be sufficient to determine whether a strap is compromised or at risk of failure. Certain proposed solutions to detect whether straps are damaged may be expensive, inefficient, or ineffective.

SUMMARY OF THE INVENTION

There is provided in one embodiment a strap tension detector for detecting tension in a strap having a length and width. A housing has an upper portion and a lower portion and a first strap-receiving opening and a second strap-receiving opening. The upper portion and lower portion are adapted to receive the strap between the upper portion and the lower portion and extend through the first and second strap-receiving openings. A strain beam is mounted to one of the upper portion and the lower portion. The strain beam is arranged at an angle to the strap to extend across the width of the strap when the strap is placed between the upper portion and the lower portion and extending through the first and second strap-receiving openings so that the strap bears on the strain beam when taut. A strain gauge is operatively connected to detect strain across the strain beam.

In various embodiments, there may be included any one or more of the following features: the strain beam is arranged to extend across the width of the strap substantially perpendicularly to the length of the strap; the strain beam is mounted on the one of the upper portion and the lower portion at positions beyond the width of the strap on both sides of the strap; the lower portion and upper portion are pivotally mounted together to be moveable between an open position and an operating position; the first strap-receiving opening and the second strap-receiving opening are each defined by the upper and lower portions when in the operating position; the first and second strap receiving openings define respective first and second nodes against which the strap is restrained during use and in which the strain beam extends perpendicularly through a plane defined by the nodes defined by the first and second strap receiving openings; the strain beam is biased against the strap in use; the strain gauge further comprises two strain gauges, each strain gauge embedded on either side of the strain beam; the upper and lower portions are secured together with an over-center latch; the housing fully encloses an interior when the strap is positioned between the upper portion and the lower portion in the operating position; a transmitter connected to receive a signal from the strain gauge and a battery connected to power the transmitter; the battery and the transmitter are fully enclosed within the housing when the strap is positioned between the upper portion and the lower portion and extending through the first and second strap-receiving openings; the strain beam further comprises a compressible contact surface which is positioned to contact the strap during use; the compressible contact surface is rounded; and the strain detected by each of the two strain gauges are averaged to determine a strain measurement.

These and other aspects of the system and method are set out in the claims, which are incorporated here by reference.

BRIEF DESCRIPTION OF THE DRAWINGS

Preferred and alternative examples of the present invention are described in detail below with reference to the following drawings.

Embodiments will now be described with reference to the figures, in which like reference characters denote like elements, by way of example, and in which.

DETAILED DESCRIPTION OF THE PREFERRED EMBODIMENT

In some embodiments there is disclosed a strap tension detector for enhancing safety by wirelessly connecting tension sensors on one or more straps on a transport vehicle or trailer to a driver's mobile phone to report loose straps or dangerous tension levels.

Figures 1, 2, 3, 4:
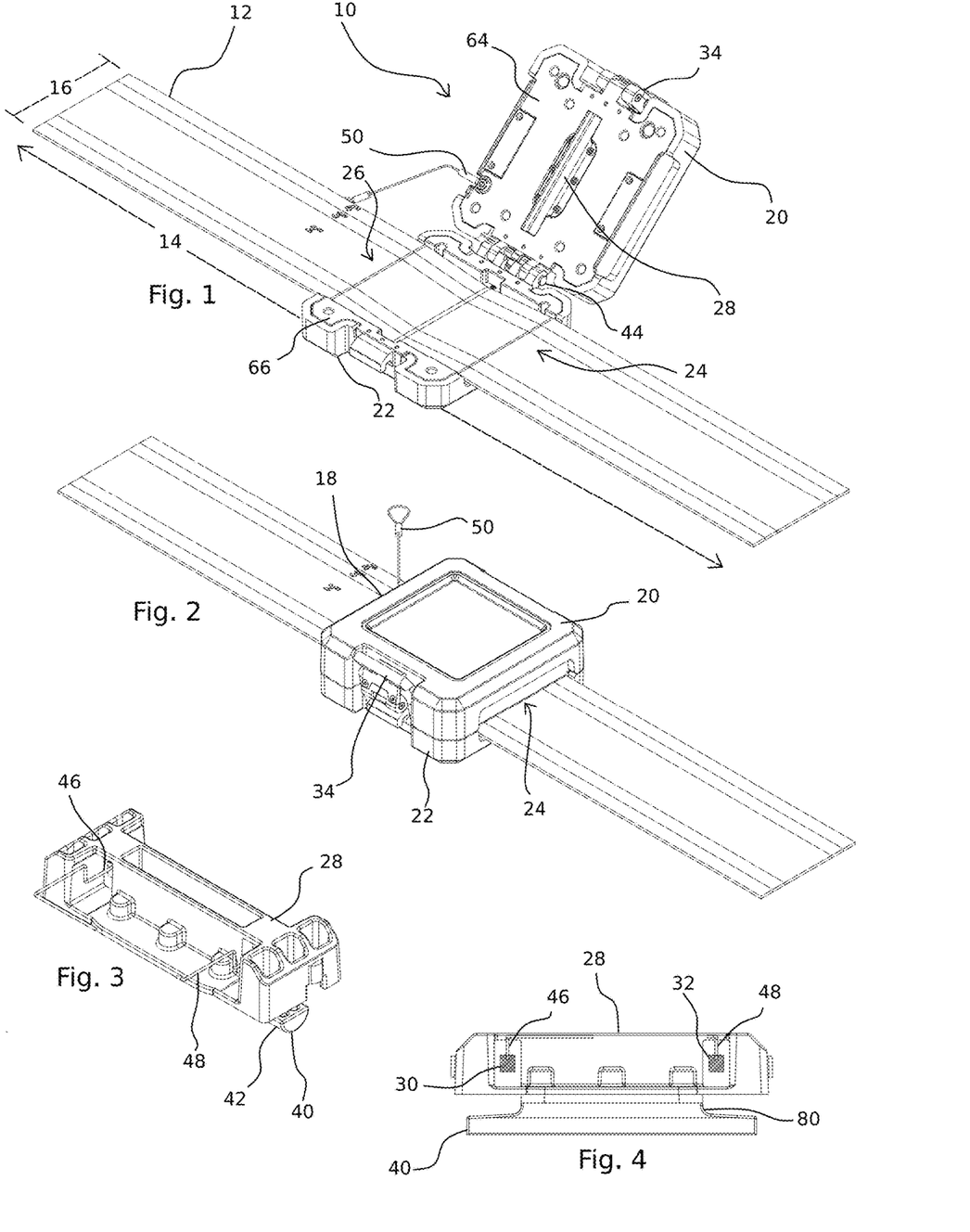
FIG. 1 is an isometric view of a strap tension detector in an open position.
FIG. 2 is an isometric view of the strap tension detector of FIG. 1 in an operating position.
FIG. 3 is an isometric view of a strain beam.
FIG. 4 is a side view of the strain beam of FIG. 3.
Figure 21:
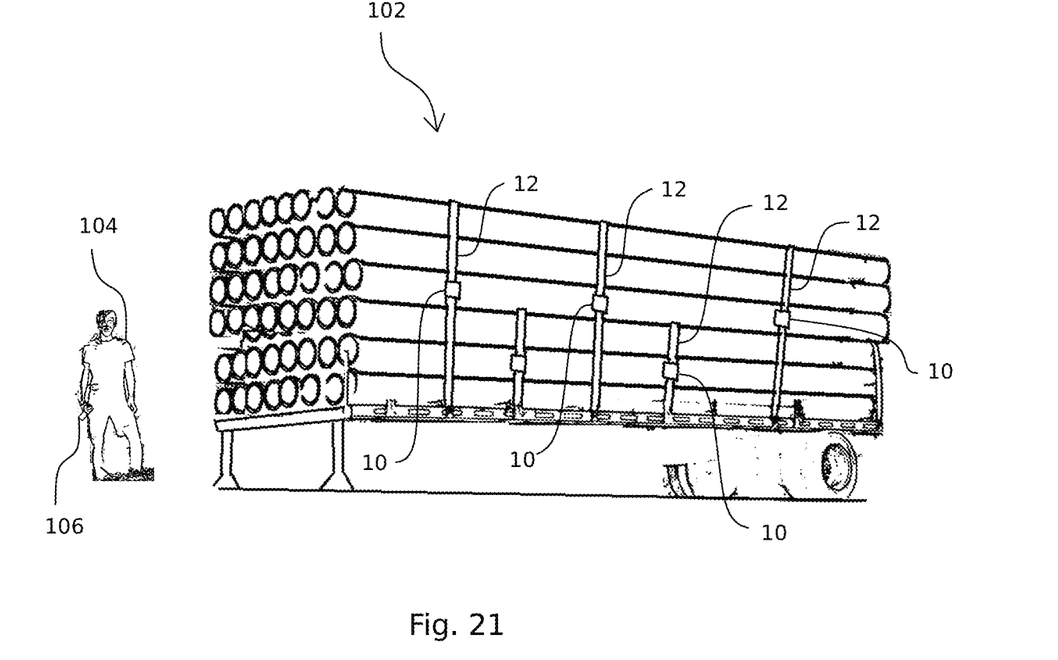
FIG. 21 is a schematic view of a driver and transport trailer with a plurality of strap tension detectors in an operating position on straps.

In FIGS. 1 to 11, there is an embodiment of a strap tension detector 10 for detecting tension in a strap 12 having a length 14 and width 16. A housing 18 has an upper portion 20 and a lower portion 22. The housing 18 has a first strap-receiving opening 24 and a second strap-receiving opening 26 in the operating position (FIG. 2). The upper portion 20 and the lower portion 22 are adapted to receive the strap 12 between each portion. The strap 12 extends through the first and second strap-receiving openings 24, 26 as shown in FIG. 2. A strain beam 28 is mounted to one of the upper portion 20 and the lower portion 22. The terms 'upper portion' and 'lower portion' are used interchangeably and the use of the words upper and lower are used for convenience in describing the components. In operation, the upper portion may face up or may face down or any other direction. The portion that the strain beam is attached to is described herein as the upper portion 20. The upper and lower portions may have any shape or configuration as long as the upper and lower portions create two fixed nodes (FIG. 16) between which the strain beam may detect the tension of the strap. The upper portion may include an enclosed area or interior containing the necessary electronics to allow the strap to communicate information about detected strain measurements to a remote device, such as a mobile device 106 (FIG. 21). The lower portion may have little to no structure so long as the lower portion cooperates with the upper portion to secure the strap.

The strain beam 28 is arranged at an angle to the length of the strap 12 to extend across the width of the strap 12 when the strap 12 is placed between the upper portion and the lower portion during use. As shown in FIG. 1, the strain beam 28 extends across the width of the strap substantially perpendicularly to the length of the strap. In other embodiments, the strain beam could be arranged at a different angle. The angle of the strain beam relative to the length of the strap allows the strap to bear on the strain beam when taut. The strain beam 28 may be integral with the upper portion or may be a separate component from the upper portion 20 that is secured, for example, by bolts, to the upper portion. The strap tension detector may have a safety tether 50. The safety tether can be connected to the strap or to some part of the transport vehicle or cargo so that the strap tension detector does not fall off the vehicle or cargo if it disconnects from the strap.

Figure 18:
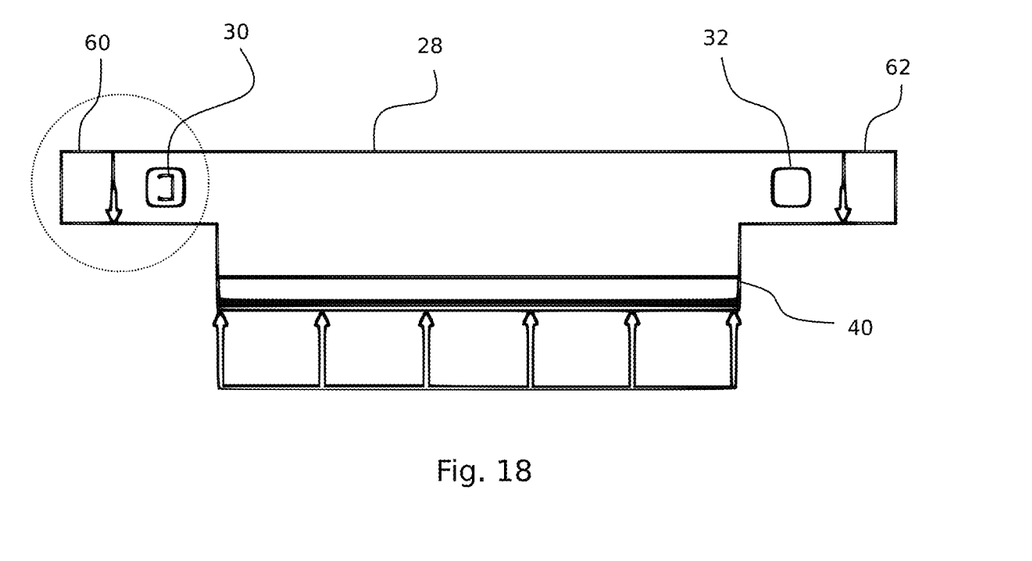
FIG. 18 is a side view of the forces on a strain beam.

A strain gauge is operatively connected to detect strain across the strain beam 28. In the embodiment in FIGS. 3 and 4, there are at least two strain gauges 30, 32, with each strain gauge embedded within the strain beam 28 on either side of the strain beam as shown in FIG. 4. The strain gauges 30, 32 may be placed beyond the width of the strap on either side. As shown in FIG. 3, the strain gauges 30, 32 are placed beyond the width of an intermediate connector 80 between a compressible contact surface 40 of the strain beam 28 and the body of the strain beam. The strain gauges 30, 32 detect the strain on the strain beam created by the taut strap pushing against the compressible contact surface 40 which in turn pushes against the upper portion at outer mounting tabs 60, 62. Preferably, the strain gauges extend further out than the narrowest portion of the beam between the gauges and the contact surface 40. This allows the strain gauges to detect the strain on the beam created by the competing forces from the strap and the opposite resisting force on the outer mounting tabs 60, 62 as depicted in FIG. 18. The strain detected by each of the strain gauges may be averaged to determine a strain measurement.

Figure 9:
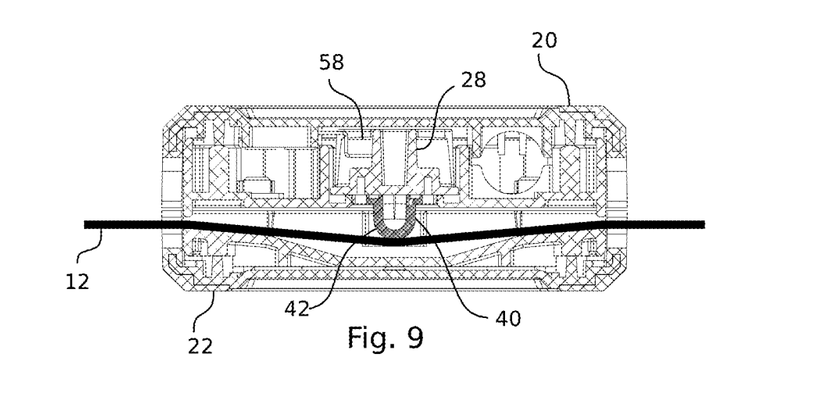
FIG. 9 is a section view of the strap tension detector of FIG. 8 through the section A-A in FIG. 8.
Figure 10:
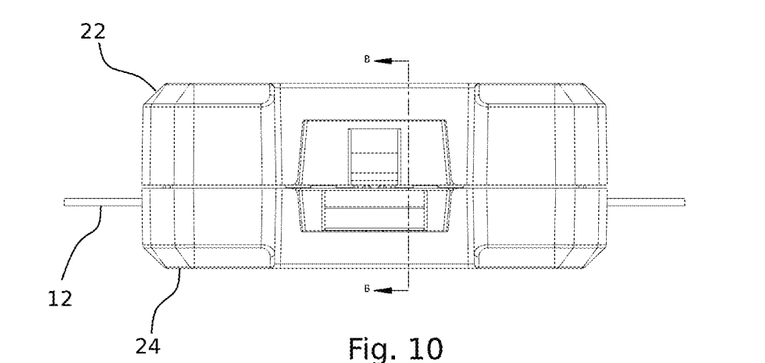
FIG. 10 is a side view of a strap tension detector.
Figure 11:
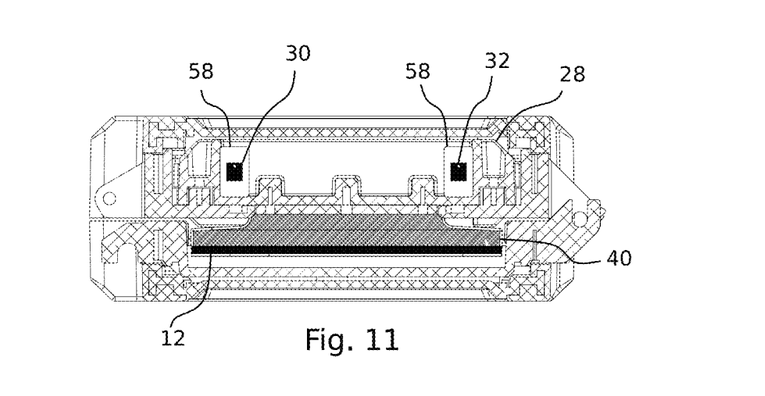
FIG. 11 is a section view of the strap tension detector of FIG. 10 through the section B-B in FIG. 10.

The lower portion 22 and upper portion 20 may be pivotally mounted together with a hinge 44 (FIG. 4) allowing the portions to move between an open position and an operating position. Other connecting mechanisms, such as multiple latches or clamps, are possible to secure the upper and lower portions together as long as the connecting mechanisms can withstand the force of the strap and are easily removable. A hinge provides an easily removable mechanism for securing the portions together. The compressible contact surface is positioned to contact the strap during use. As shown in FIG. 9 the portion 42 of the compressible contact surface that contacts the strap may be rounded. A rounded contact surface 42 may reduce potential damage to the strap during use.

Figure 16:
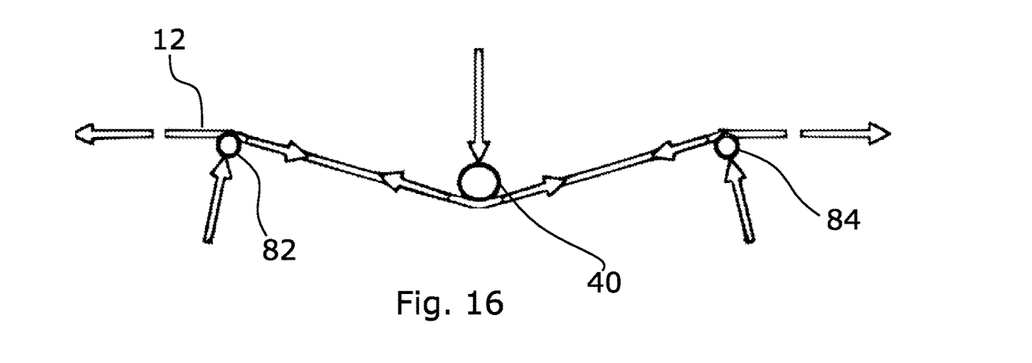
FIG. 16 is a schematic view of forces on a strap tension detector created by a strap in tension.

As shown in FIGS. 1 and 2, the first strap-receiving opening 24 and the second strap-receiving opening 26 are each defined by the upper and lower portions 20, 22 when in the operating position (FIG. 2). In the embodiment shown in FIG. 1, the upper and lower portions 20, 22 have matching openings so that when the upper and lower portions are placed together they form a slot in the operating position through which the strap 12 passes. Various designs of first and second strap-receiving openings 24, 26 may be used so long as the strap is arranged to provide tensioning force against the strain beam or other strain detector. The first and second strap-receiving openings 24, 26 define respective first and second nodes 82, 84 (FIG. 16) against which the strap is restrained during use. The strain beam and contact surface 40 extends perpendicularly through a plane defined by the nodes 82, 84 so that the strap presses against the strain beam when taut. The nodes 82, 84 may be defined by the first and second strap receiving openings or may be a separate structural piece of either of the upper or lower portions 20, 22 to provide rigid contact points against the strap. The nodes 82, 84 may be any component of the strap tension detector as long as the nodes are more resistive to the force created by the tension of the strap 12 than the strain beam 28. FIG. 16 is a schematic view of the general forces between the nodes 82, 84 and the contact surface 40 of the strain beam created by the strap tension. The strain beam may be biased against the strap in use as shown in FIG. 16.

In FIG. 9, the strain beam contact surface is biased against the strap through a spring gauge substrate 58 which biases the contact surface towards to the strap to resist the force of the strap against the strain beam when the strap is taut. The compressible contact surface 40 may be made of a compressible material that provides a further biasing force against the strap 12. The spring gauge 58 and compressible contact surface 40 may be selected so that the contact surface provides a biasing force against the strap in the operating position. The force collectively provided by the spring gauge 58 and compressible contact surface 40 may be selected based on various factors including the anticipated strap tension and structure of the strain beam. In other embodiments, various other biasing means may be used to provide a biasing force against the strap 12 when in an operating position. The biasing force may be provided through the structure of the strain beam itself, for example, if the material has some degree of compressibility or deformability.

Figure 14:
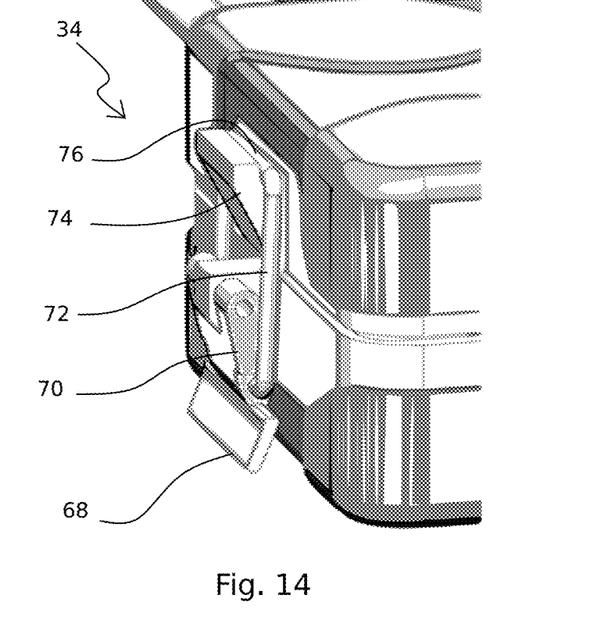
FIG. 14 is isometric view of an over-centre latch on a strap tension detector.

FIG. 14 is an over-center latch 34 to secure the strap tension detector in the operating position. The latch 34 includes a release handle 68 connected by a pair of pivot arms 70, 72. The first pivot arm 70 pivots from a pivot point on the lower portion 22 and the second pivot arm 72 has a cross-beam 76 which is received within a slot on a connecting piece 74 on the upper portion 20. The over-center latch 34 is self-energizing and may assist to prevent theft and increase security.

Figure 15:
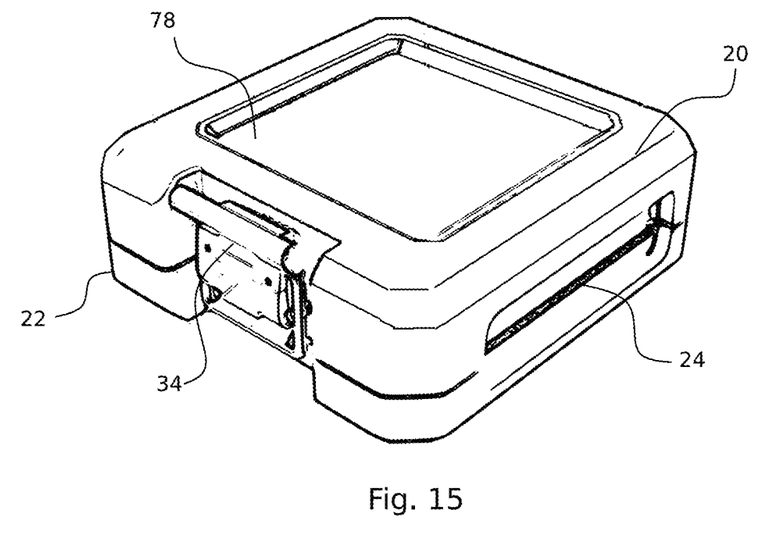
FIG. 15 is an isometric view of a strap tension detector having a recessed top.

FIG. 15 shows the first strap-receiving opening without a strap through the strap tension detector. The strap tension detector has a recessed area 78 on the upper portion 20.

Figure 13:
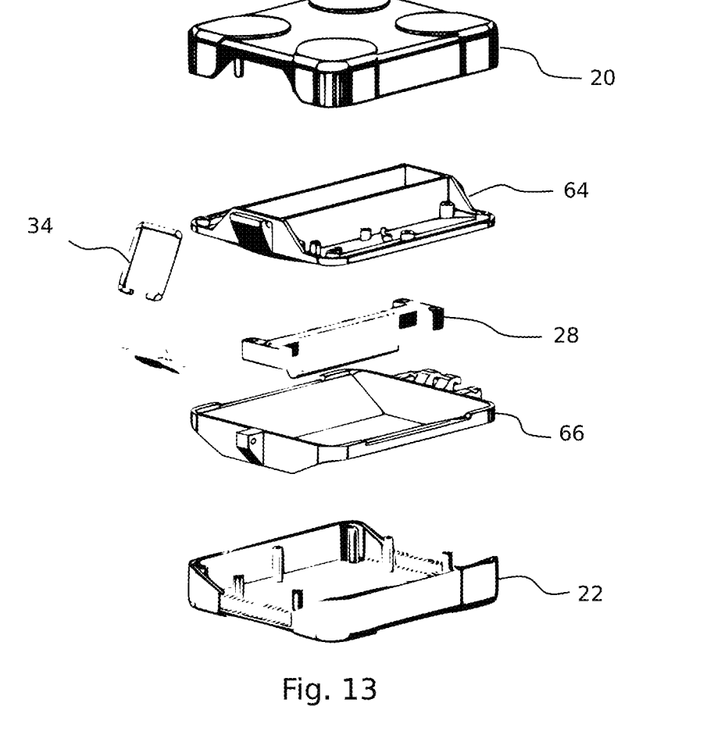
FIG. 13 is an exploded isometric view of a strap tension detector.

As shown in FIG. 13, the housing 18 including the upper portion 20 and top lid 64 fully enclose an interior of the strap tension detector 10 when in the operating position. A bottom lid 66 may be placed between the strap and the lower portion 22. Any electronics may be placed within the enclosed interior. The interior may be sealed.

Figure 5:
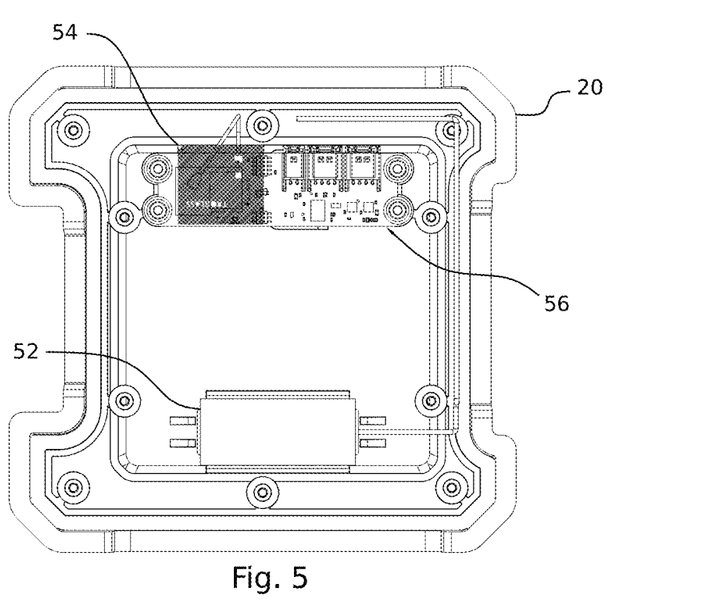
FIG. 5 is a section view of an upper portion of a strap tension detector along section A-A in FIG. 6.
Figure 6:
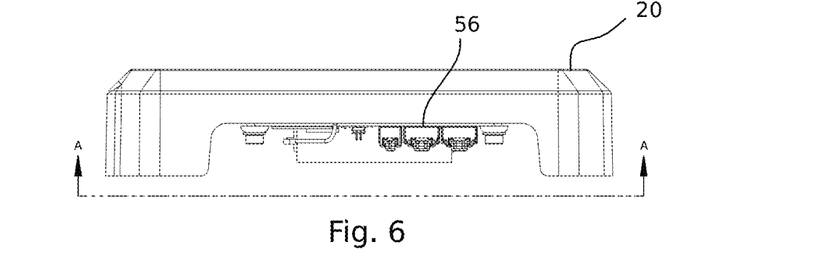
FIG. 6 is a side view of the upper portion of the strap tension detector of FIG. 6.
Figure 7:
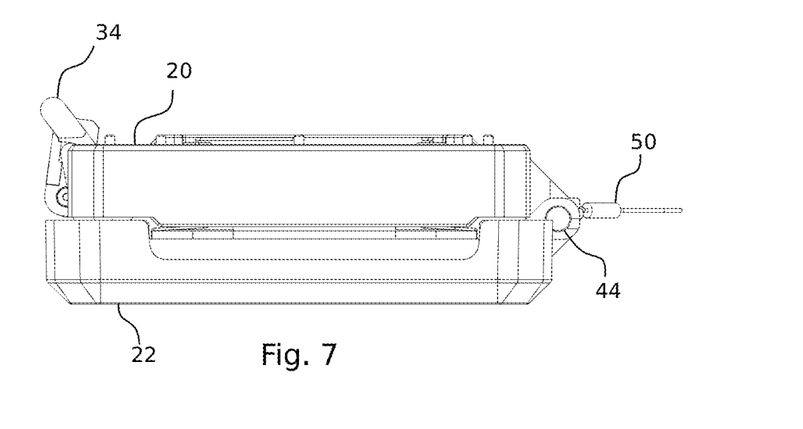
FIG. 7 is a front view of a strap tension detector.
Figure 8:
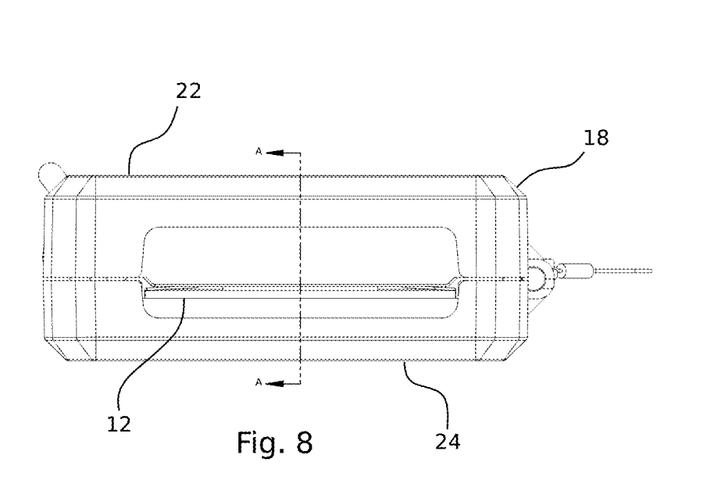
FIG. 8 is a front view of a strap tension detector.

As shown in FIGS. 5 and 6, there is a transmitter including a processor 56 and antenna 54 connected to receive a signal from the strain gauge. The processor 56 may be connected to the strain gauges 30, 32, by wires 46, 48 (FIG. 3). The processor 56 may be a printed circuit board assembly or another type of processor may be used. There is a battery 52 connected to power the transmitter. The top lid 64 is not shown in FIGS. 5 and 6 to allow for a view of the interior. The transmitter and battery are fully enclosed within the interior of the housing. Having the electronic contained within the interior of the housing protects the electronics from the elements or tampering. The top lid 64 provides additional security so that the interior cannot be easily accessed even when the strap tension detector is in a closed position. The top lid 64 also protects the electronics within the enclosed space from contaminants that may otherwise be brought in by the strap. In other embodiments, the interior may be formed between the upper and lower portions without the top lid 64. The battery, process and antenna may be any components that collectively allow for wireless communication of strain detected by the strap tension detector to another device. The battery could be omitted if power is supplied from an outside source. The antenna could be omitted if information is stored and subsequently accessed directly from the strap tension detector, such as a USB link to a mobile phone.

Figure 12:
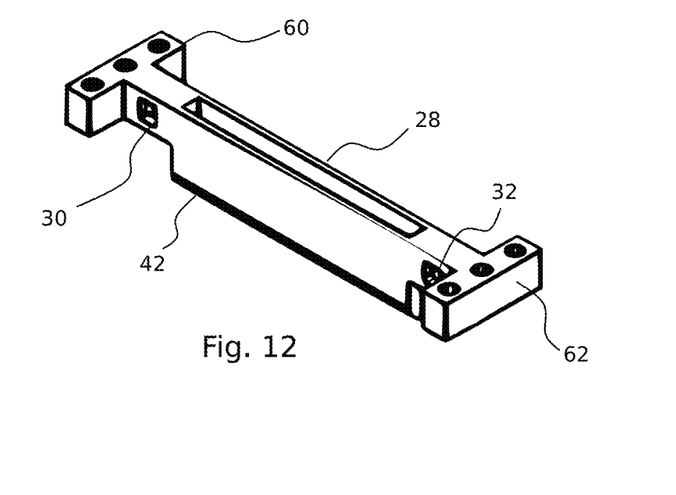
FIG. 12 is an isometric view of a strain beam having multiple strain gauges.

In FIGS. 12 and 13, there is an embodiment of a strap tension detector having a strain beam without an intermediate connector 80 (FIG. 4) between the compressible contact surface 40 and the body of the strain beam 28.

Figure 17:
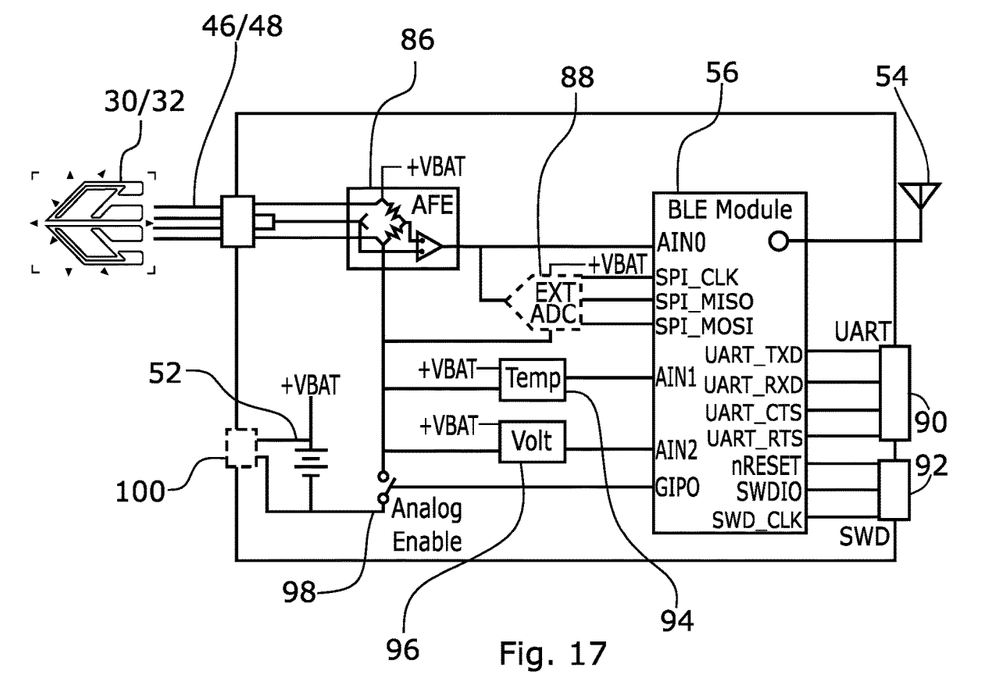
FIG. 17 is a schematic of the electronics of a strap tension detector.

FIG. 17 is an exemplary schematic of the electronics in the strap tension detector. The battery 52 may be connected to a connector 100 which allows for recharging from an external power source. The battery may also or alternatively be replaceable. There is a switch 98 which allows for the strap tension detector to be turned on, for example, manually. The processor 56 may be a Bluetooth™ low energy module. A temperature sensor 94 and volt sensor 96 may also be connected to the processor 56 to provide additional readings from the strap tension detector. An analog front-end controller 86 may process signals from the temperature sensor 94, the volt sensor 96 or the strain gauges 30, 32. There may also be an analog to digital converter 88 for further processing of signals. There may also be a universal asynchronous receiver-transmitter 90 and serial wire debug interface 92 for sending output from the processor 56.

Figure 19:
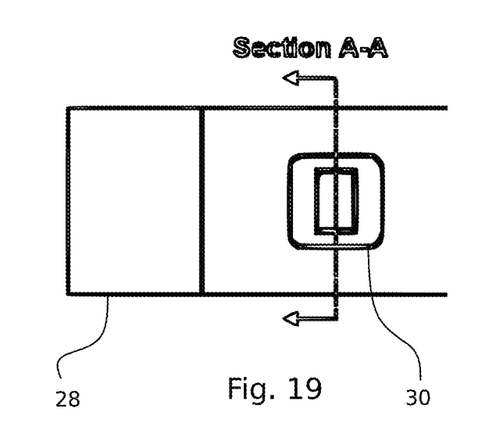
FIG. 19 is a close-up view of a portion of the strain beam of FIG. 18.
Figure 20:
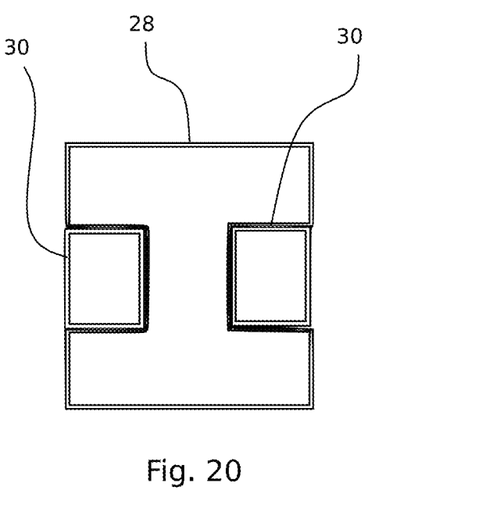
FIG. 20 is a cross-section view of the strain beam of FIG. 18 through the section A-A of FIG. 19.

FIGS. 18-20 show a strain beam having strain gauges 30, 32 recessed into the strain beam body to form an I-cross section as shown in FIG. 20. The force of the strap shown in FIG. 18 causes a reactionary force on the sides of the strain beam connected to the body of the strap tension device to create strain which may be detected by the strain gauges 30, 32. The strain beam may be fixed on the underside of the two outer mounting tabs 60, 62. In some embodiments, the strain gauges may be dual element strain gauges. Each of the two dual element strain gauges may output a single value as an average of the strain across the two elements for each strain gauge. The averaged outputs from each of the dual element strain gauges will then be processed by the processor, which may or may not calculate an average of the values across the two dual element strain gauges. The output shear values from each of the strain gauges will be used to determine strain values. The strain gauges may be transducer class strain gauges such as are sold by Micro Measurements.

FIG. 21 shows a plurality of strap tension detectors 10 on a number of straps 12 on a transport vehicle or trailer 102. A driver 104 may receive updates in real time from the strap tension detectors 10 through a mobile phone 106 which reports loose straps or dangerous tension levels. The tension strap detectors 10 may also communicate with each other using BLE or other means. In operation, multiple strap tension detectors may be connected to various straps on a transport vehicle or other cargo. Each of the processors may be configured to communicate wirelessly with another device, such as a mobile device of an operator of the vehicle or to each of the other strap tension detectors. For example, each strap tension detector may be configured to chirp out its measurements. Any device configured to receive the information, such as a mobile device with an app for receiving the measurements, can receive updates from all of the operational strap tension detectors attached to straps on the cargo. The information obtained by the mobile device can be processed and utilized in whatever manner is desired. For example, the app on the mobile device may ignore information from strap tension detectors that it is not interested in. The wireless connection may be provided, for example, using Bluetooth™ lower energy. Initial setup or re-calibration of the strap tension detectors may be provided using a dongle that connects to a computing device such as a personal computer or laptop via a USB or other means.

In an embodiment, the system may run on a Nordic™ nRF52810 system-on-chip. The software architecture may include an application layer including BLE (interfaces with the RADIO Nordic™ Driver), ADC (interfaces with the SAADC Nordic™ Driver), Pin Config (interfaces with the GPIO Nordic™ Driver) and a FDS (File Data Storage used to manage persistent variables).

In an embodiment, the main function of the application may including the following:
a. initialization of the system clock, peripherals, and memory;
b. perform correction of the strain gauge offset;
c. check if performing load cell calibration is necessary;
d. acquire a strap tension measurement on a fixed schedule;
e. acquire a temperature measurement on a fixed schedule;
f. acquire a battery voltage measurement on a fixed schedule;
g. check if a sudden change in the strap tension has occurred;
h. control when BLE advertising packets are reported;
i. transmitting BLE advertising packets;
j. control when the watchdog timer is reset; and
k. handle sleep and wake-up cycles.

An exemplary sample of action steps for implementation by the processor include the following:

| Action | Frequency (Hz) | Period (ms) | Condition |
|---|---|---|---|
| Measure strap tension | 1 | 1000 | Always occurs. |
| Chirp out non-connectable BLE advertising packet | (⅓) | 3000 | If the strap tension has not undergone any sudden changes since the last BLE chirp, and is above the minimum tension. This timing can be modified via the appropriate register. |
| | 8 | 125 | If the strap tension experiences a trigger condition. This timing can be modified via the appropriate register. |
| | 1 | 1000 | During Manufacturing Mode. This timing can be modified via the appropriate register. |
| Chirp out connectable BLE advertising packet | 8 | 125 | If the strap tension dropped below the minimum tension threshold, whose value is set in the appropriate register. This timing can be modified via the appropriate register. |
| | (⅑) | 9000 | During Suspended Mode. This timing can be modified via the appropriate register. |
| Watchdog timeout | (⅔) | 1500 | If the watchdog timed out. |

The frequency of the above steps may be customized based on a particular application. The manufacturer can set certain default values for the timing of these steps and the timing may be modified by the end user depending on the particular conditions for that end user.

In an embodiment, there are the following trigger conditions:
 a. A sudden positive % change of the strap tension. The change in strap tension may be required to be above a threshold value for the condition to be valid.
 b. A sudden positive change in the fixed value of the strap tension. In cases where there is both a sudden positive % change and a positive change in the fixed value, the lesser of the values set in the register for those values will take precedence.
 c. A sudden negative % change of the strap tension. The change in strap tension must be greater than threshold for the condition to be valid.
 d. A sudden negative change in the fixed value of the strap tension. In cases where there is both a sudden negative % change and a negative change in the fixed value, the lesser of the stored values set in the register for those values will take precedence.
 e. The strap tension drops below a specified tension value. In some embodiments, this is the only condition that will make the Secure Strap connectable over BLE.

Duration restrictions may be put into place after certain conditions occur. This may be done to conserve battery life, prevent over-firing of the BLE chirps in situations where the strap tension may be jittering, and to minimize the time a BLE central device can stay connected to the Secure Strap.

Duration restrictions may include:
 a. Amount of time to chirp at the higher frequency, after any of a sudden negative or positive % or fixed value change is triggered:
 b. Amount of time to chirp at the higher frequency, after a strap tension drops below a specified tension value was triggered.
 c. Amount of time to wait and chirp at the lower frequency, before checking for another strap tension trigger condition. During this period, a noise flag in the status byte may be set.
 d. Amount of time to wait to receive a valid BLE packet while connected to a BLE central device.

To prevent constant cycling of the accelerated frequency while in a minimum tension state, the Secure Strap will stop cycling after a set value is reached. While in this state, the Secure Strap may enter Suspended Mode and behave in the following manner:
 a. The Secure Strap will chirp out connectable BLE packets at a certain frequency.
 b. The minimum tension trigger condition will not occur again until a tension above the minimum tension is first detected before the tension goes below the set minimum tension value.
 c. Suspended mode will not exit until the measured strap tension exceeds the set minimum tension value.
 d. After exiting Suspended Mode, the cycle count relative to the cycling value will be reset.

The following types of information may be communicated over BLE:
 a. Encryption Key: Public encryption key for security.
 b. Signature: A preamble to identify that a Secure Strap packet is received.
 c. Version: A version byte whose value can be read via the stored information in the register. The upper nibble may be used as a 4-bit product ID. The lower nibble may be used for the version itself. Example: A version value of [0x31] corresponds to a product ID of 0x3 and a version of 0x1.
 d. Status: A status byte used to indicate the state of the system. The individual bits of this byte indicate any errors that occur to help notify of potential issues with the hardware.
 e. Unique ID: A 6-byte unique ID on the Nordic™ nRF52810. This value is obtained from the stored information in the registers on the nRF52810.
 f. Temperature: A signed 1-byte Temperature in degrees Celsius.
 g. Counter: A 2-byte count value that is incremented each time the Secure Strap wakes up.
 h. Strap Tension Data: the measured strap tensions.
 i. CRC-8: An error-detecting code for the other 28 bytes of user-defined payload. This field helps to safeguard the credibility of the packet.

The system may report one or more of the following error types: Strap Tension Error, Temperature Error, Battery Error, Calibration Error, Watchdog Error (previous data missing or unknown), Noise Flag (a sudden change in tension or tension dropped below a minimum condition had occurred previously), Battery End-Of-Life, and may include one or more reserved error codes.

The counter may be a 2-byte field that contains two parts. The lower 3 bits will contain a counter that is incremented during the accelerated BLE reporting period that occurs after a sudden change in tension or after a drop below the minimum tension was detected. This counter will roll over to 0 after it reaches the maximum 3-bit value of 7. The remaining 13 bits will contain a counter that increments at a rate of 1 Hz, representing a value in seconds. The counter will roll over to 0 after it reaches the maximum 13-bit value of 8191. The counter can be used by the mobile application to keep track of packets, ensure it is receiving the expected packet, and fill in missing historical packets if desired. The mobile application should ignore packets which have a counter value less than the last received counter and set the last received counter equal to the counter just received. This helps protect against replay attacks.

The strap tension data values are 1-byte in length. Each LSB of the data byte is represented by TLSB, whose value is set in the REG_TENSION_RESOLUTION register. As such, the strap tension can be computed as follows:

Actual Load Cell Tension=Load Cell Data Byte× $T_{LSB}$

Examples of strap tension values for $T_{LSB}$=25 lbs are shown in Table 10.

TABLE 10

Selected 1-byte strap tension values

| 1-Byte Strap tension Value | Actual Strap tension, for TLSB = 25 [lbs] |
|---|---|
| 0 | lower than 25 |
| 1 | 25 to 49 |
| 10 | 250 to 274 |
| 100 | 2500 to 2524 |
| 200 | 5000 to 5024 |
| 255 | greater than 6375 |

Strap tension data may include 11 bytes representing the strap tension at times t, t−1, . . . t−10. In this embodiment, the device will measure values between 0-6,375 lbs in 25 lb increments. In other embodiments, the max measurable load can be set at a higher value such as up to to 8,000 lbs to account for higher loading scenarios. In the diagram shown in FIG. 16, based on the forces shown, 8,000 lbs of strap tension would equate to approximately 1,300 lbs on the strain gauge substrate.

The user payload portion of the advertising packet is obfuscated to help protect against replay and arbitrary injection attacks. The user payload data may be encrypted using the following: A 2-byte public encryption key. The public key consists of two byte values that are randomly generated every reporting period. The lower 10 bits are the initial offset into the lookup table, and the upper 6 bits are the stride for determining the next byte. A randomly generated 1024-byte pre-shared private key. This key may be required on the mobile application in order to properly decrypt the received advertising packet.

The temperature sensor may measure the ambient temperature. A thermistor in the circuit may be used to measure the temperature. A general curve fitting formula is generated using the thermistor data sheet. The generated formula is used by the Secure Strap firmware to calculate a temperature value in degrees Celsius.

The voltage of the battery may be measured according to the battery's approximate state of charge. The battery level may be recorded as either OK or LOW. The LOW level is set when the measured voltage drops below the voltage threshold set in the register. A bit in the Status byte may be used to indicate the battery level. A bit value of 0 may be used to indicate the battery is OK, and a bit value of 1 may indicate a battery LOW.

The strap tension function measures the ADC voltage via the load cell interface and converts the ADC voltage to a tension in pounds. The strap tension is computed by interpolating and extrapolating with calibration variables, which are set during calibration.

The strap tension can be calibrated using the following equation:

$$T_{strap} = \frac{(T_{cal\ ref})}{(ADC_{cal\ ref} - ADC_{zero\ offset})}(ADC_{strap} - ADC_{zero\ offset})$$

Where:
$T_{strap}$=Strap tension to compute,
$ADC_{strap}$=Measured ADC voltage for the strap tension,
$T_{zero\ offset}$=Zero offset strap tension,
$ADC_{zero\ offset}$=Measured ADC voltage for the zero offset strap tension,
$T_{cal\ ref}$=Calibrated reference strap tension, and
$ADC_{cal\ ref}$=Measured ADC voltage for the calibrated strap tension.

$T_{strap}$ may be quantized down to a 1-btye strap tension value as follows:

$$T_{1\ byte} = {}^{FLOOR}\left\lfloor\frac{T_{strap} + \left(\frac{T_{LSB}}{2}\right)}{T_{LSB}}\right\rfloor,$$

with $T_{1\ byte}$ having a maximum value of 255.

And the $T_{strap}$ values may be stored in a circular queue that is filled each time a measurement is made. A running total of the queue is kept for computing the average and is updated by subtracting the oldest value and adding the newest after each measurement.

Each time a new strap tension measurement is made, it will be compared to the running average of the previous tension values. If the change of the new measurement compared to the running average is lesser than one of the threshold values, the Strap Tension function will inform the BLE Reporting function to chirp out advertising packets at the set rates and durations. Similarly, if the new measurement is below the threshold minimum tension set in the register, the Strap Tension function will inform the BLE Reporting function to chirp out advertising packets at the set rates and durations.

The watchdog function resets the watchdog timer to ensure that the system is in a healthy state. If the watchdog timer is not reset within its designated time, the watchdog module resets the system.

Once a BLE central device (e.g. phone application or PC application) has connected to the Secure Strap, the function handles the following:
 a. Receives appropriate BLE data after the Secure Strap has connected to a BLE central device.

b. Correct the strain gauge offset computation. This is already done on first power up, but an option to perform it manually may be available in this mode.
c. Writes calibrated load cell data to memory. The calibrated data can then be used by the Strap Tension function.
d. Reads from or writes to a Secure Strap register.
e. Disconnects from the BLE central device if no valid BLE packets are received within a specified time.

While connected to a BLE central device, the Secure Strap will continue to send BLE reports via non-connectable advertising packets. The system may move between power modes depending on the situation.

Immaterial modifications may be made to the embodiments described here without departing from what is covered by the claims. For example, In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A strap tension detector for detecting tension in a strap having a length and width, comprising:
    a housing comprising an upper portion and a lower portion, and a first strap-receiving opening and a second strap-receiving opening, the upper portion and lower portion being adapted to receive the strap between the upper portion and the lower portion and extending through the first and second strap-receiving openings;
    a strain beam mounted at fixed positions on one of the upper portion and the lower portion, the fixed positions each being beyond the width of the strap on respective sides of the strap, the strain beam arranged at an angle to the strap to extend across the width of the strap when the strap is placed between the upper portion and the lower portion and extending through the first and second strap-receiving openings, so that the strap bears on the strain beam when taut and applies a bending load within the strain beam between the fixed positions; and
    a strain gauge operatively connected to detect strain across the strain beam between the fixed positions.

2. The strap tension detector of claim 1 in which the strain beam is arranged to extend across the width of the strap substantially perpendicularly to the length of the strap.

3. The strap tension detector of claim 1 in which the lower portion and upper portion are pivotally mounted together to be moveable between an open position and an operating position.

4. The strap tension detector of claim 1 in which the first strap-receiving opening and the second strap-receiving opening are each defined by the upper and lower portions when in the operating position.

5. The strap tension detector of claim 4 in which the first and second strap receiving openings define respective first and second nodes against which the strap is restrained during use and in which the strain beam extends perpendicularly through a plane defined by the nodes defined by the first and second strap receiving openings.

6. The strap tensioning detector of claim 1 in which the strain beam is biased against the strap in use.

7. The strap tension detector of claim 1 in which the strain gauge further comprises two strain gauges, each strain gauge embedded on either side of the strain beam.

8. The strap tension detector of claim 1 in which the upper and lower portions are secured together with an over-center latch.

9. The strap tension detector of claim 1 in which the housing fully encloses an interior when the strap is positioned between the upper portion and the lower portion in use.

10. The strap tension detector of claim 1 further comprising a transmitter connected to receive a signal from the strain gauge and a battery connected to power the transmitter.

11. The strap tension detector of claim 10 in which the battery and the transmitter are fully enclosed within the housing when the strap is positioned between the upper portion and the lower portion and extending through the first and second strap-receiving openings.

12. The strap tension detector of claim 1 in which the strain beam further comprises a compressible contact surface which is positioned to contact the strap during use.

13. The strap tension detector of claim 12 in which the compressible contact surface is rounded.

14. The strap tension detector of claim 7 in which the strain detected by each of the two strain gauges are averaged to determine a strain measurement.

15. The strap tension detector of claim 10 in which the transmitter further comprises a processor.

16. The strap tension detector of claim 15 in which the processor further comprises a wireless connection module having transmission power less than 100 mW and having a range less than 100 m.

* * * * *